(12) United States Patent
Lent et al.

(10) Patent No.: US 7,698,708 B1
(45) Date of Patent: Apr. 13, 2010

(54) METHOD AND SYSTEM FOR PERSISTENT, RECOVERABLE USER-LEVEL LOCKS

(75) Inventors: Marianne C. Lent, Santa Clara, CA (US); Charles H. Silvers, Santa Clara, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1460 days.

(21) Appl. No.: 10/903,291

(22) Filed: Jul. 30, 2004

(51) Int. Cl.
*G06F 9/46* (2006.01)
(52) U.S. Cl. ....................................... 718/104; 718/102
(58) Field of Classification Search ................ 718/102, 718/104
See application file for complete search history.

(56) References Cited

U.S. PATENT DOCUMENTS

| | | | | |
|---|---|---|---|---|
| 5,283,896 A | * | 2/1994 | Temmyo et al. | 718/104 |
| 5,689,706 A | * | 11/1997 | Rao et al. | 707/201 |
| 6,598,068 B1 | * | 7/2003 | Clark | 718/104 |
| 6,857,085 B1 | * | 2/2005 | Ruhlen et al. | 714/38 |
| 7,103,631 B1 | * | 9/2006 | van der Veen | 709/205 |
| 7,213,248 B2 | * | 5/2007 | Arimilli et al. | 718/104 |
| 7,386,848 B2 | * | 6/2008 | Cavage et al. | 718/102 |
| 2003/0177367 A1 | * | 9/2003 | King et al. | 713/185 |

* cited by examiner

*Primary Examiner*—Meng-Ai An
*Assistant Examiner*—Camquy Truong
(74) *Attorney, Agent, or Firm*—Campbell Stephenson LLP

(57) ABSTRACT

Methods, systems, and apparatus can provide a means for a user-level process to acquire locks on resources at the kernel level through the use of a session that persists after the termination of the user-level process. A session recovery mechanism can be provided so that a newly started process can query an existing kernel-level lock session to discover which locks were held by a previously terminated process. This is accomplished, in part, through associating the kernel session with a token, rather than by associating the locks with a user-level process ID. Such a mechanism provides the ability for the new process to perform appropriate lock cleanup or to continue the work of the previous process under protection of the surviving locks.

28 Claims, 8 Drawing Sheets

METHOD AND SYSTEM FOR PERSISTENT, RECOVERABLE USER-LEVEL LOCKS

FIELD OF THE INVENTION

The invention relates generally to operating systems. More particularly, the invention relates to methods and systems for maintaining persistent, recoverable user-level locks.

BACKGROUND OF THE INVENTION

Information drives business. A hardware or software failure affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from hardware and software failures.

Many complex business applications are run not on a single computer system, but in a distributed system in which multiple computer systems, referred to as nodes, each contribute processing resources and perform different tasks. In such an environment, disruption due to hardware and software failures can be lessened or prevented using a strategy known as clustering. In a clustered environment, computer systems and storage devices are interconnected, typically at high speeds within a local data center, for the purpose of improving reliability, availability, serviceability, and/or performance via load balancing. Redundant interconnections between the computer systems are typically included as well, and the collection of computer systems, storage devices, and redundant interconnections is referred to herein as a cluster. In some implementations, the cluster appears to users as a single highly available system. Different types of clusters may be established to perform independent tasks, to manage diverse hardware architectures performing similar tasks, or when local and backup computer systems are far apart physically.

In some clustering environments, only one of the computer systems in the cluster provides processing resources with respect to a particular software application. In other clustering environments, processing for a single software application is distributed among nodes in the cluster to balance the processing load.

Within a single computer system, multiple threads executing a given software application may access and/or update the same data or resources. The term 'thread' is used to describe the context in which a computer program is being executed. This context includes the program code, the data for execution of the program code, a stack, a program counter indicating a memory location from which the next instruction will come, and state information. Coordination is necessary to ensure that one thread does not read shared data or access a shared resource at the same time that another thread is updating that data or resource, thereby possibly resulting in an inconsistency or conflict depending upon the timing of the two operations. In clustering environments where processing for a given software application is "load balanced," threads that share data or resources can be running on different nodes within a cluster.

Coordination between threads accessing shared data or resources is often implemented using locks. Typically, a lock is software that protects a piece of shared data or a resource; for example, in a file system, a lock can protect a file or a disk block. In a distributed system, a lock can also protect shared "state" information distributed in memories of each node in the system, such as the online or offline status of a given software application. All shared data is protected by a lock, and locks are typically managed by a lock manager, which often provides an interface to be used by other application programs.

A lock is requested before the calling application program can access data protected by the lock. A calling application program can typically request an "exclusive" lock to write or update data protected by the lock or a "shared" lock to read data protected by the lock. If the calling application program is granted an exclusive lock, then the lock manager guarantees that the calling program is the only thread holding the lock. If the calling program is granted a shared lock, then other threads may also be holding shared locks on the data, but no other thread can hold an exclusive lock on that data.

The lock manager cannot always grant a lock request immediately. Consider an example in which one thread has an exclusive lock on a given set of data, and a second thread requests shared access to the given set of data. The second thread's request cannot be granted until the first thread has released the exclusive lock on the given set of data.

A lock can be placed on data that are stored on a shared disk. Locks can also be placed on shared data stored in memory for each node, where the data must be consistent for all nodes in a cluster. For example, nodes in a cluster can share information indicating that a file system is mounted. A lock can be placed on the shared state information when the state of the file system changes from mounted to not mounted, or vice versa.

In situations in which a process running in the user level of a node needs access to either system or cluster-wide resources protected by locks, such locks are generally implemented in the kernel of a node. To allow the user process to use the kernel-level locks, a user-kernel interface is provided. An issue with such a user-kernel interface is if the user-level process is abnormally terminated before releasing the lock, the lock can remain orphaned in a held state in the kernel. What is therefore needed is a solution that addresses a situation in which one or more locks are orphaned by the abnormal termination of a process holding the lock(s).

SUMMARY OF THE INVENTION

The present invention presents a method, system, and apparatus that provide a means for a user-level process to acquire locks on resources at the kernel level through the use of a session that persists after the termination of the user-level process. This invention provides a session recovery mechanism, so that a newly started process can query an existing kernel-level lock session to discover which locks were held by a previously terminated process. This is accomplished, in part, through associating the kernel session with a token provided by the user session, rather than by associating the locks with a user-level process ID. The present invention further provides the ability for the new process to perform appropriate lock cleanup or to continue the work of the previous process under protection of the surviving locks. The present invention further provides the ability for an application program to be designed to associate application-defined state information with a lock.

Accordingly, one aspect of the present invention provides a method for associating a lock with a kernel-level session in which the kernel-level session is identified with a token. A lock is requested using a token, wherein the token identifies a kernel-level session. In response to the requesting, the lock is received and associated with the kernel-level session.

Another aspect of the present invention provides a method, apparatus and computer program product wherein a kernel-level session is associated with a token. A lock to a resource is then allocated to the kernel-level session.

Another aspect of the present invention provides a system. The system comprises a kernel session, which is configured to acquire a lock to a resource. The kernel session is also configured to control access to the kernel session using a token. The kernel session is further configured to persist beyond termination of a user process.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The present invention provides a means for user-level processes to perform actions on locked resources so that the locks on those resources persist after an abnormal termination of the user-level process. This is done by providing a mechanism for the user-level process to create and interact with a kernel-level session to which the locks are associated. In such an arrangement, should the user-level process abnormally terminate, then the kernel-level session continues to exist and hold onto the locks. Later the kernel-level session can be accessed by a subsequent user-level process to optionally complete the operations of the previously terminated user-level process or release the locked resources for use by other processes. In order for the user-level process to communicate with the kernel-level session, a conduit is provided. Such a conduit may take the form of a set of library routines (i.e., an application program interface (API)), coupled with an input/output controller (i.e., an ioctl). In order to access the kernel-level session, a token or keyword is associated with the session and provided by the user-level process to allow the user-level process access.

In the present invention, a token uniquely identifies a kernel-level session so that user-level processes can access the kernel-level session and locks to resources associated with the kernel-level session. In one embodiment of the invention, the user-level process provides the token when the user-level process requests initiation of the kernel-level session, thus associating the token with the kernel-level session. Subsequent access to the kernel-level session by any user-level process is accomplished by providing the token. The token is a unique identifier (for example, a keyword). The token can be a constant value associated with a program running as a user-level process, or a random value (such as a process ID), so long as the random value is made of record so that a subsequent user-level process may determine the token value in the event of abnormal termination of the first user-level process (as will be discussed more fully herein). Record of a token value can be stored where a user-level process can access the value, including a user-level memory or a kernel-level memory. In one embodiment of the invention, any user-level process providing the token can have access to the kernel-level session and the associated locks, and multiple user-level processes supplying the token can access the kernel-level session simultaneously should privileges associated with the locks permit.

Figure 1:
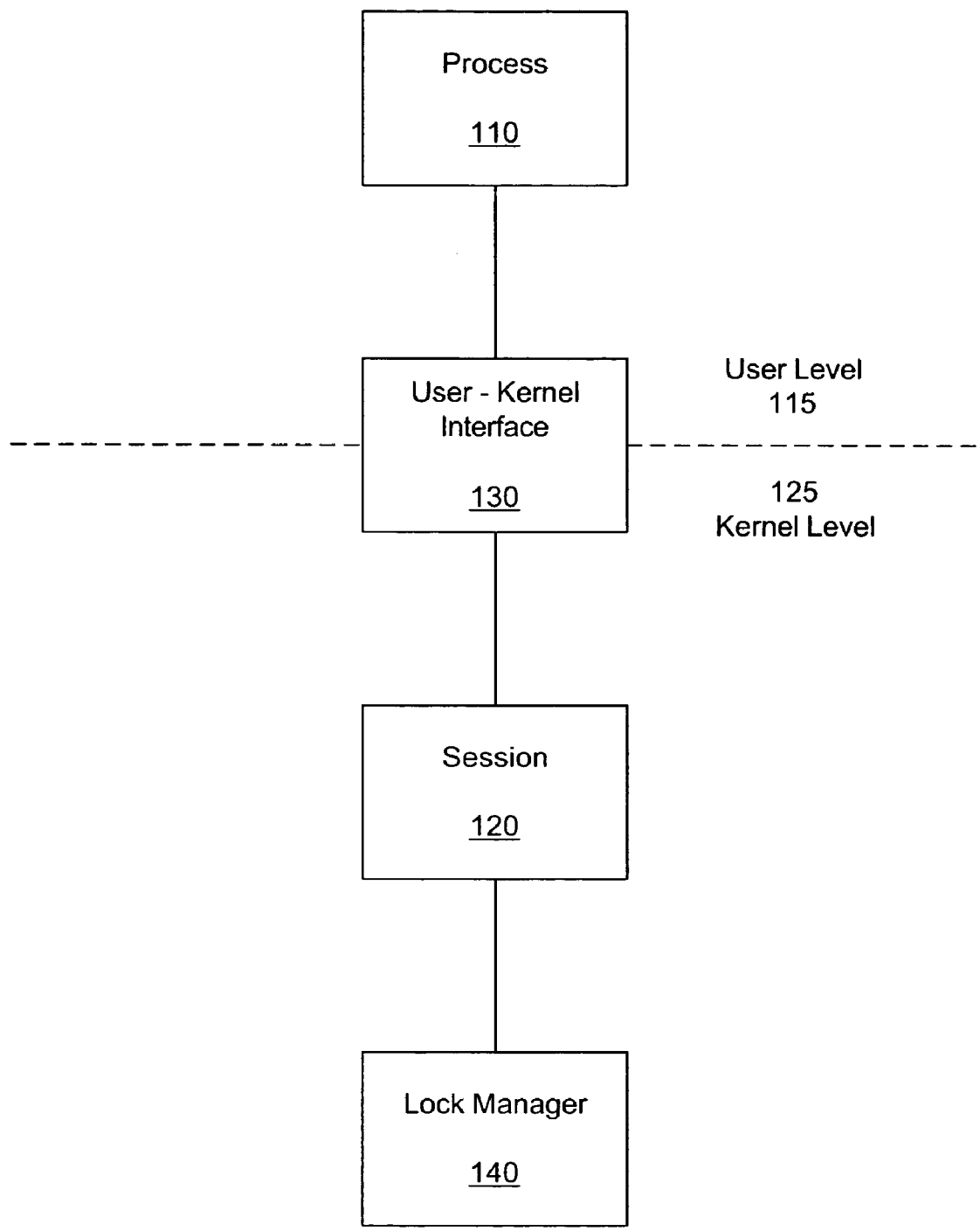
FIG. 1 is a block diagram illustrating modules and their interconnections as contemplated by the present invention.

FIG. 1 illustrates a set of modules suggested by the present invention. In FIG. 1, the user-level process is represented by a process 110, which is executed at a user level 115. Process 110 can be any process that requires the use of a resource. In order to obtain a right to use that resource, the acquisition of a lock may be necessary. To gain access to the resource, the process requests the initiation of a kernel-level session 120, which is executed at a kernel level 125. Communication between the user-level process and the kernel-level session is supported by a user-kernel interface 130. The user-kernel interface acts as a conduit between user-level 115 and the kernel-level 125. The session module 120 is responsible for interacting with the lock manager 140 in order to acquire rights to appropriate locks for the needed resources.

Figure 2:
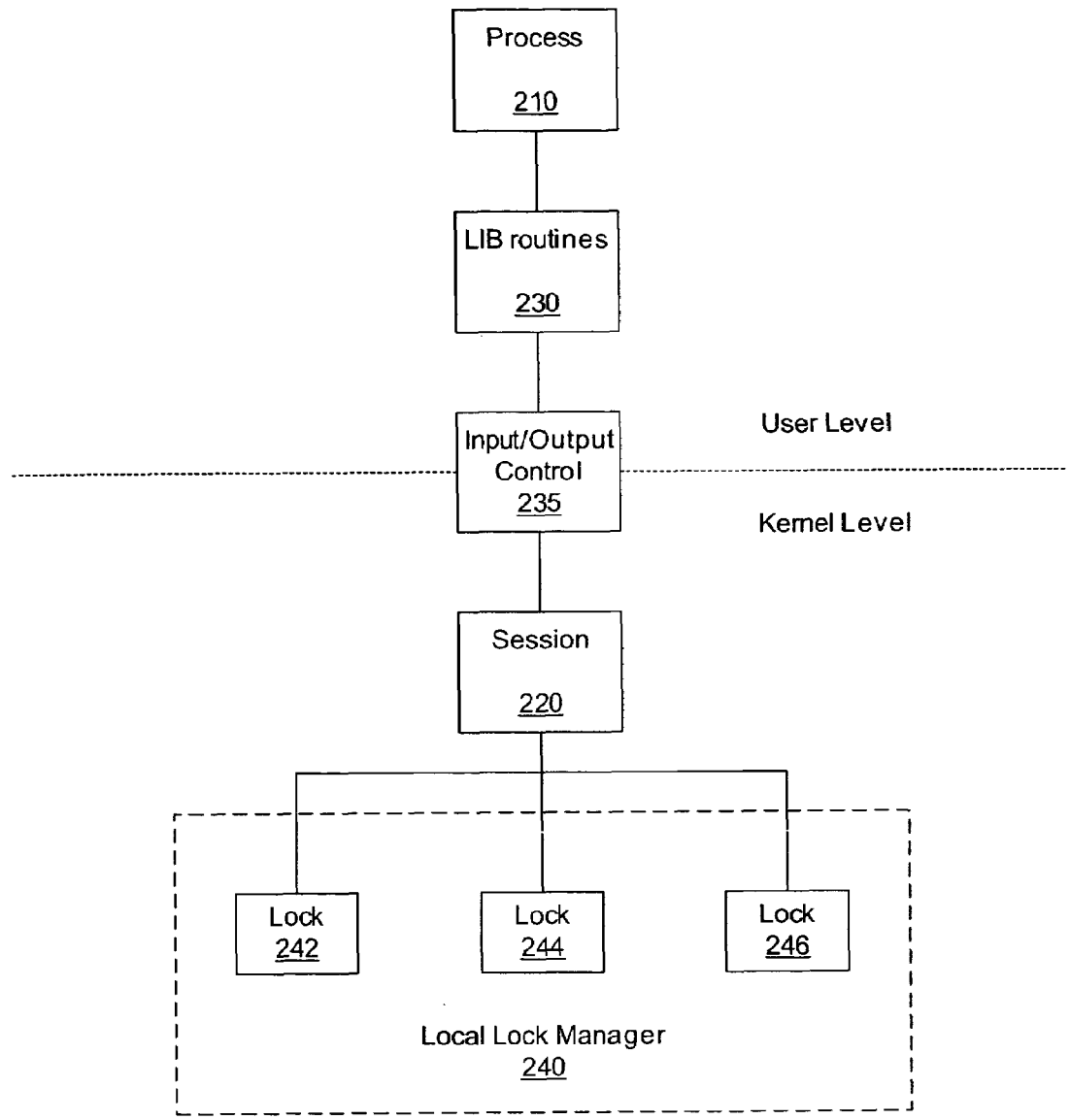
FIG. 2 is a block diagram illustrating additional modules and their interconnections as contemplated by the present invention.

A more detailed representation of the various modules is presented in FIG. 2. Again the user-level process 210 communicates with the kernel-level session 220 through the use of a user-kernel interface. Such a user-kernel interface is provided by modules for library routines 230 and an input/output control module 235. In one embodiment, the library routines are implemented as an application program interface (API) that provides a set of defined routines to control the kernel-level session. An input/output control module 235 then provides the user-level process with control over system resources by providing calls to an appropriate device driver (i.e., a file system device driver). For example, library routines can be provided for creating and destroying the kernel-level session, allocating and deallocating locks, and acquiring and releasing locks. The session module 220 is responsible for interacting with the local lock manager 240 to allocate and acquire locks on the desired resources. The local lock manager distributes locks to resources over which the local lock manager has authority (such as locks 242, 244 and 246). In a distributed computing environment, or cluster computing environment, the local lock manager can also communicate with a cluster lock manager responsible for distributing locks to resources available to the entire cluster. FIGS. 1 and 2 demonstrate the modular nature of the present invention. This modular nature suggests that locks can persist at the kernel level through the session modules even though the user level module ceases to exist.

Figure 3:
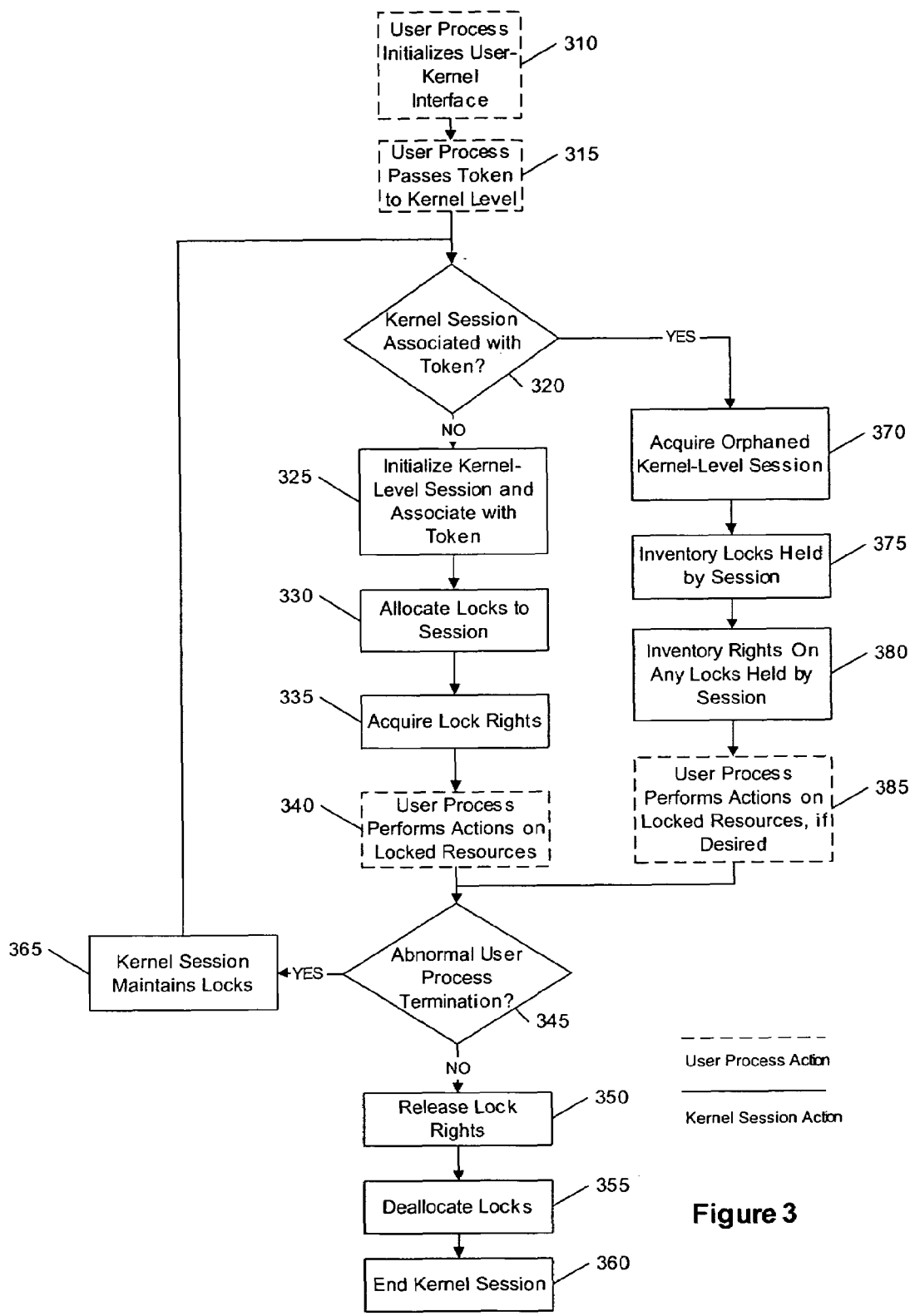
FIG. 3 is a flowchart of the actions taken at the kernel-level in acquiring and maintaining locks to resources in accordance with the present invention.

FIG. 3 is a flow diagram that details the ability of the kernel-level session to persist after a termination of the user-level process. Blocks 310 and 315 take place at the user-level and provide context for the remainder of the chart. The user-level process initiates the user-kernel interface (310), thereby acquiring access to the various routines necessary to set up the persistent locks. In one embodiment, the user-level process then passes a token to the kernel level (315) as part of the initialization of the kernel-level session. At that point, a determination is made as to whether or not there is an existing kernel-level session associated with the token (320). If there is no existing kernel-level session associated with the token, then a kernel-level session can be initialized and associated with the token (325). Note that a token is a way to uniquely identify the kernel-level session. Such a unique identity becomes important during lock recovery operations. In another embodiment, a kernel-level session can generate an identifier token. This token can then be passed to the user-level process, which would then store the token in a location that could persist beyond a termination of the user-level process (e.g., a disk file) and be accessible to subsequent user-level processes (as discussed below).

Once the token-associated session is created, the user-level process can request a lock to a resource. In response to the user-level process lock request, the kernel level session can request that locks be allocated to that session (330) and rights associated with those locks be acquired (335). A lock on a resource will be allocated in kernel memory and will be associated with the specific session, rather than with the user-level process that called for the locked resource. The act of acquiring lock rights (335) can be handled through a local lock manager. When requesting lock rights, the user-level process can enter a wait state until the rights to use the locked resources requested have been granted. At that time, the user process performs actions on the various locked resources (340).

Additionally, a user-kernel interface can be provided to allow application-defined state information to be associated with each kernel-level session and with each lock. For example, a lock namespace can be associated with a session; such a lock namespace can be shared among a plurality of kernel-level sessions. As another example, a process checkpoint identifier can be associated with a lock, to assist in recovery operations in the event that the lock is orphaned by a process failure and then recovered again.

Should the user-level process normally complete operations and no longer require the resources, the user-level process can then cause the kernel-level session to release the locks (350), cause the locks to be de-allocated (355), and cause the kernel-level session to be ended (360). In the event, however, that the user-level process abnormally terminates prior to completing operations on the locked resources, the kernel-level session can maintain the locks on those resources (365). An abnormal termination does not include a computer system crash or shut down. In the event of such a crash or shut down, the kernel-level session would not normally survive the shut down, and therefore the locks would be released or recovered by alternate means (such as a cluster lock recovery mechanism in a distributed computing environment).

In the event of an abnormal user-level process termination, a new user-level process can be initiated and can pass a token to the kernel level (310, 315). At this point, the user-level process would discover that a kernel-level session associated with the provided token (320) exists and the user-level process can acquire access to the kernel-level session (370). In response to requests from the new user-level process, an inventory of the locks held by the session can occur (375), as would an inquiry as to what rights are held on those locks (380). The new user-level process can decide to continue to perform any actions that were interrupted on those locked resources by the abnormal termination (385). Such a feature may be desirable in order to provide an illusion of continuity to processes accessing the user-level process. For example, should the user-level process be a website server application being accessed by a remote browser, then if the server abnormally terminated to be succeeded by a second server application that resumed operations where the first process left off, the web browser user would not see any disruption in service.

Once such operations are completed by the second user-level process, the user-level process can cause the kernel-level session to release the rights associated with the locks (350), de-allocate the locks (355), and can terminate the kernel session (360). Should there not be a desire for the second user-level process to perform actions on the previously locked resources, the second user-level process can clean up the locked resources by causing the release and deallocation of the locks and ending the kernel-level session.

Figure 4A:
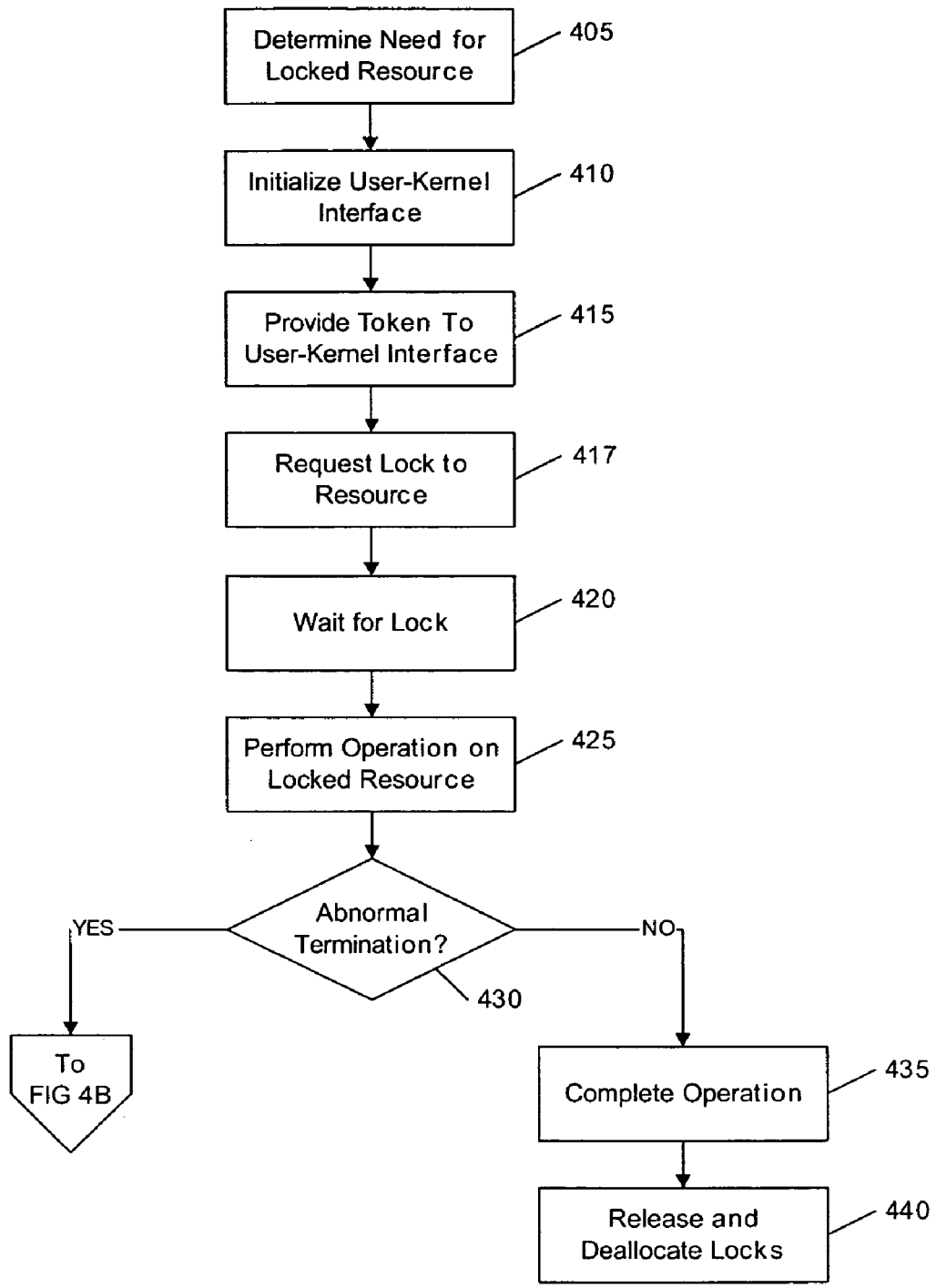
FIGS. 4A and 4B are a flowchart of the actions taken at the user level in requesting and operating on locked resources in accordance with the present invention.
Figure 4B:
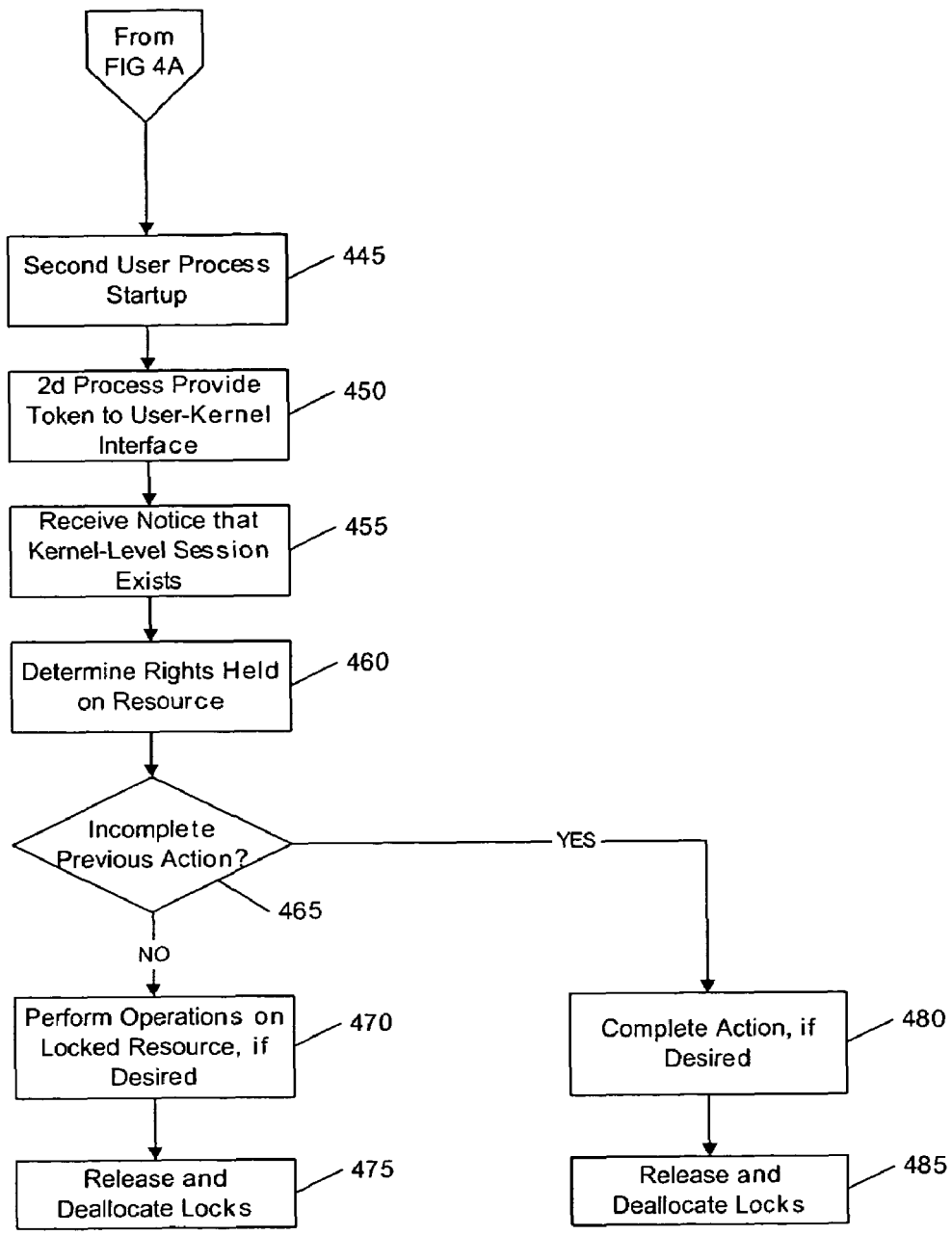

FIG. 4 demonstrates the actions that are performed in one embodiment of a user-level process of the present invention. Initially, a user-level process makes a determination that the process needs access to locked resources (405). At that point, the user-level process initializes the user-kernel interface (410) and provides a unique token to the user-kernel interface (415) to associate with the kernel-level session. The user-level process then requests the lock (417) and enters into a wait state while the necessary permissions are acquired and granted (420). Once the lock is granted, the user-level process performs operations upon the locked resource (425). Should user user-level process require arbitrary state information to be associated with a lock, such information can be transferred between the user-level and kernel-level during user-level processing. Should the user-level process normally complete operations upon the locked resource, the user-level process can then request release and deallocation of the locks (440). The user-level process can then proceed with performing other of its operations (not shown).

In the event of an abnormal termination of the user-level process (430), a second user-level process can start up (445). The second user-level process can provide the token to the user-kernel interface (450) when the process needs to perform actions upon locked resources. At this point, the user-level process will be informed of the existing kernel-level session associated with the token (455). The user-level process can make a determination as to what rights to what resources are held by the kernel-level session (460), and based upon that determination or upon other criteria determine whether the user-level process should complete any operations left incomplete by the terminated user-level process (465). The second user-level process can then complete the actions, if so desired (480), and then release and deallocate the locks (485). Should there be no incomplete previous actions then the user-level process can perform operations upon the locked resources, if so desired (470), and then request release and deallocation of the locks (475). After the user-level process has completed actions on the locks (and their associated resources), the process can continue to other operations (not shown).

The number of kernel-level sessions concurrently or sequentially existing on a node can be determined by the needs of user-level processes on that node. A user-level process can initiate and access multiple kernel-level sessions depending upon the demands of the software architecture. In such a case, each kernel-level session can be associated with a different token.

The above discussion has generally focused upon the interaction between the user-level process and an associated kernel-level session to acquire resource locks that persist after the termination of the user-level process. It has been noted that the kernel-level session can interact with a local lock manager while acquiring and allocating locks. Such a system is not only contemplated for use in a single system computer environment but also in a distributed computing environment such as that found in a cluster of networked nodes, an example of which is described below.

In a distributed computing environment, a user-level process resident on a node can require locks on resources that are available to the rest of the distributed computing network. Thus, a possibility exists for a user-level process running on one node to require access to locked resources that are already granted to a user-level process running on another node. In such a situation, should the existent lock be a grant of exclusive rights, then the process second-in-time needs to wait until the first process has released and deallocated the locked resources before the second process begins operations.

Figure 5:
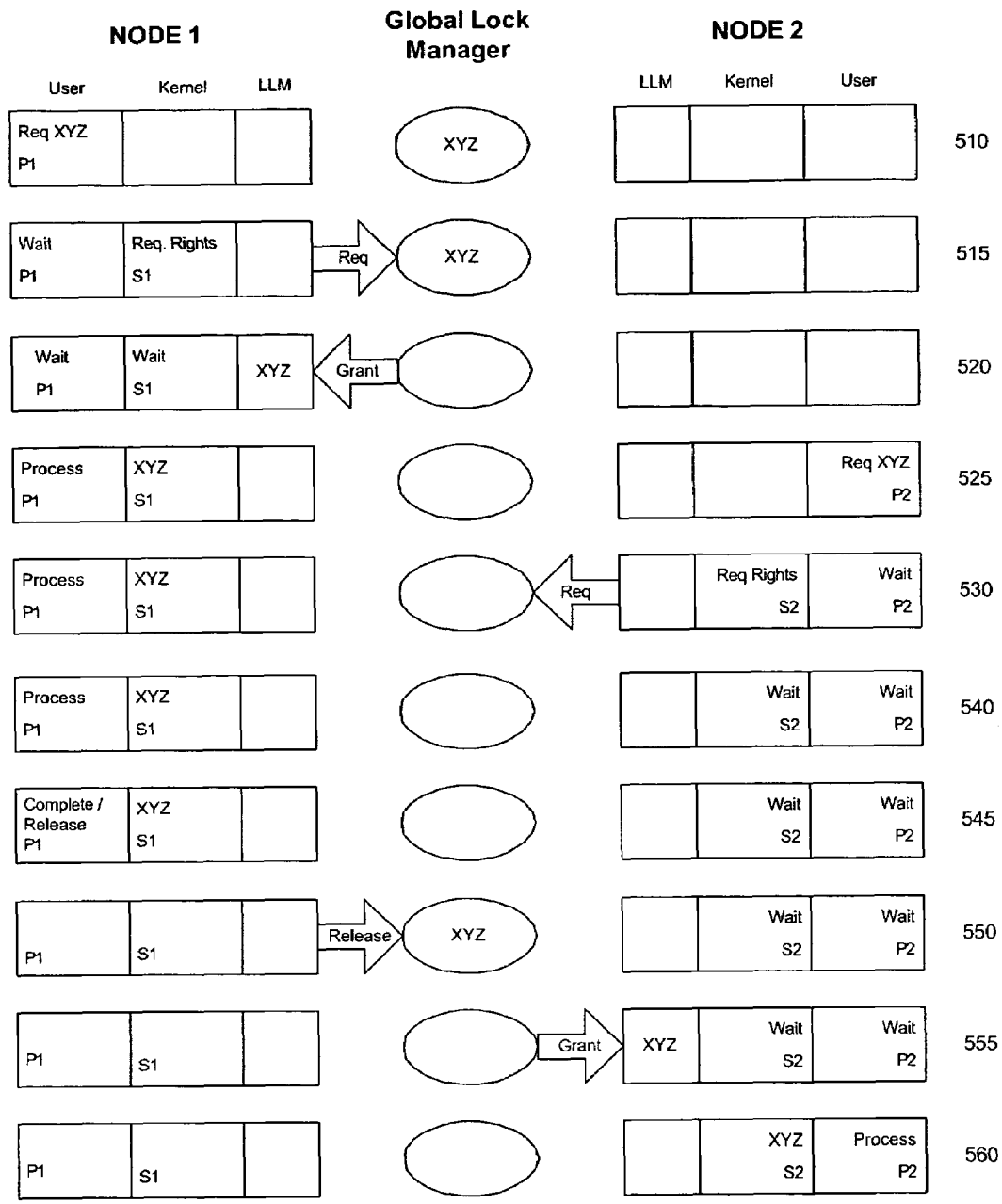
FIG. 5 is block diagram illustrating lock handling and lock conflict resolution between nodes and a global lock manager in accordance with the present invention.

FIG. 5 demonstrates the concept of internode locking under the present invention. In 510, user-level process P1 on node 1 requests resource lock XYZ. In 515, P1 waits while kernel-level session S1 on node 1 requests the rights from the Local Lock Manager (LLM) on node 1 and the LLM requests those rights from the Global Lock Manager. The Global Lock Manager can be resident on node 1 or could be resident on any other node in the distributed computing environment. The Global Lock Manager tracks and distributes locks to resources available to the entire distributed computing environment. In 520, both P1 and S1 wait while the LLM receives a grant for the resource lock XYZ from the Global Lock Manager.

At this point, the Global Lock Manager no longer has the ability to provide resource lock XYZ as it had already granted an exclusive lock to that resource. In 525, the LLM on node 1 has allocated the lock to S1, and P1 begins processing on the locked resource. In addition, in 525, a user-level process P2 on node 2 requests resource lock XYZ. In 530, P1 continues operations on the resource locked by XYZ, while at the same time kernel-level session S2 on node 2 has requested rights for XYZ from the node 2 LLM and the LLM requests those rights from the Global Lock Manager. In 540, S2 and P2 wait while the resource is tied up by P1 and S1 on node 1. This state of affairs continues as long as the rights to the resource remain with the kernel-level session S1 on node 1. Should P1 abnormally terminate, as has been set forth above, S1 continues to maintain resource lock XYZ. S1 maintains the lock until a new process is started on node 1, which then completes the operations on the resource or otherwise performs operations on the resource and then releases the resource, as in 545. In 550, the LLM on node 1 releases the resource lock and returns the lock rights to the Global Lock Manager, and then the Global Lock Manager grants the resource lock to the node 2 LLM. Finally, in 560, P2 is able to begin operations on the resource locked by XYZ, once S2 has acquired the rights to the resource.

Again, it should be noted that the present invention does not involve circumstances where the abnormal termination of process P1 occurs due to a system crash or other system failure of node 1. There will be other mechanisms built into the Global Lock Manager or other lock managing software in the distributed computer environment to recover rights to resources held by systems that crash.

As shown above, the present invention can be implemented in a multi-node environment using a variety of computer systems and networks. An example of one such computing and network environment is described below with reference to FIGS. 6 and 7.

An Example Computing and Network Environment

Figure 6:
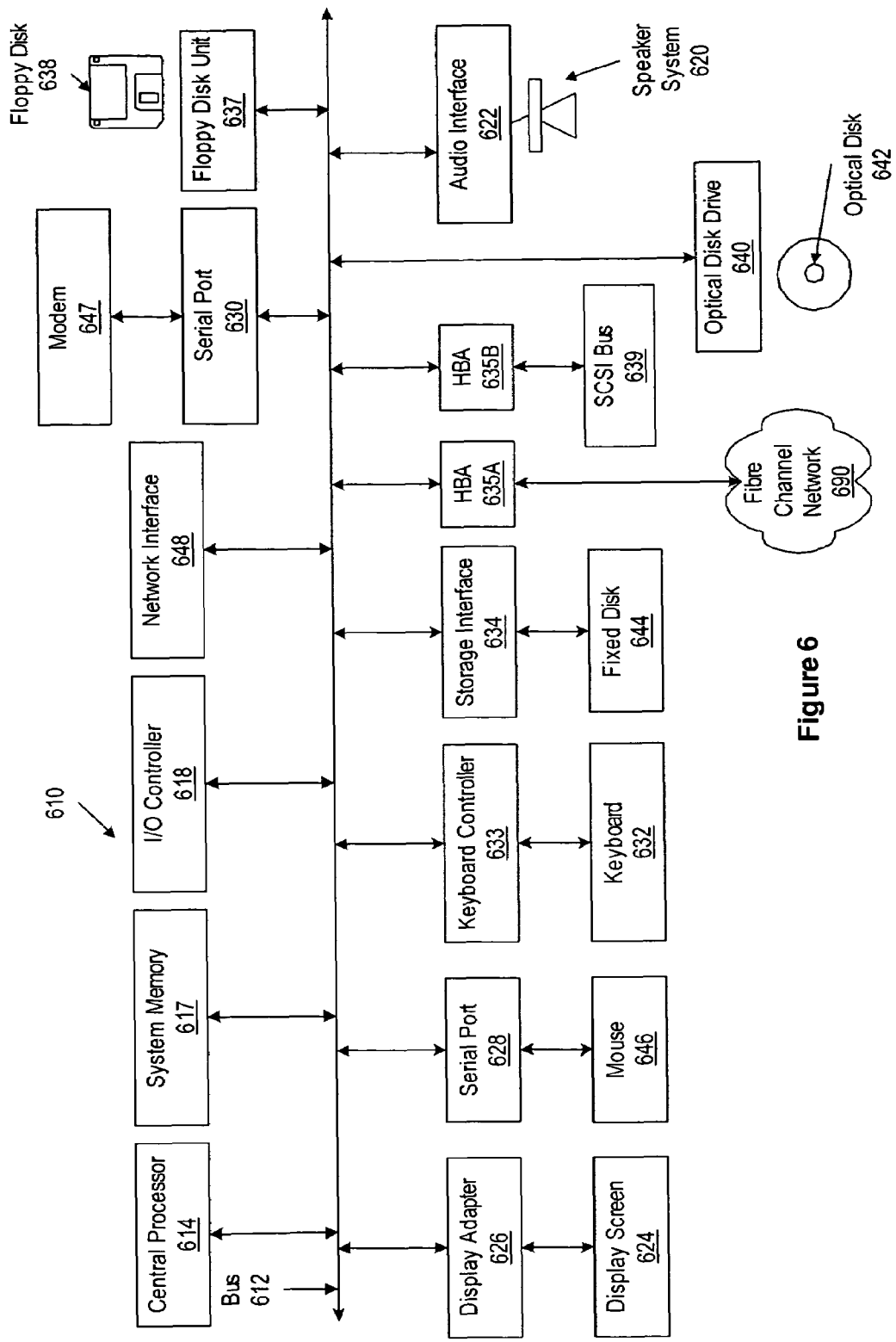
FIG. 6 is a block diagram illustrating a computer system suitable for implementing embodiments of the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. Additionally, computer system 610 can be any kind of computing device, and so includes personal data assistants (PDAs), network appliance, X-window terminal or other such computing devices. The operating system provided on computer system 610 may be MS-DOS®, MS-WINDOWS®, OS/2®, UNIX®, Linux®, or another known operating system. Computer system 610 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
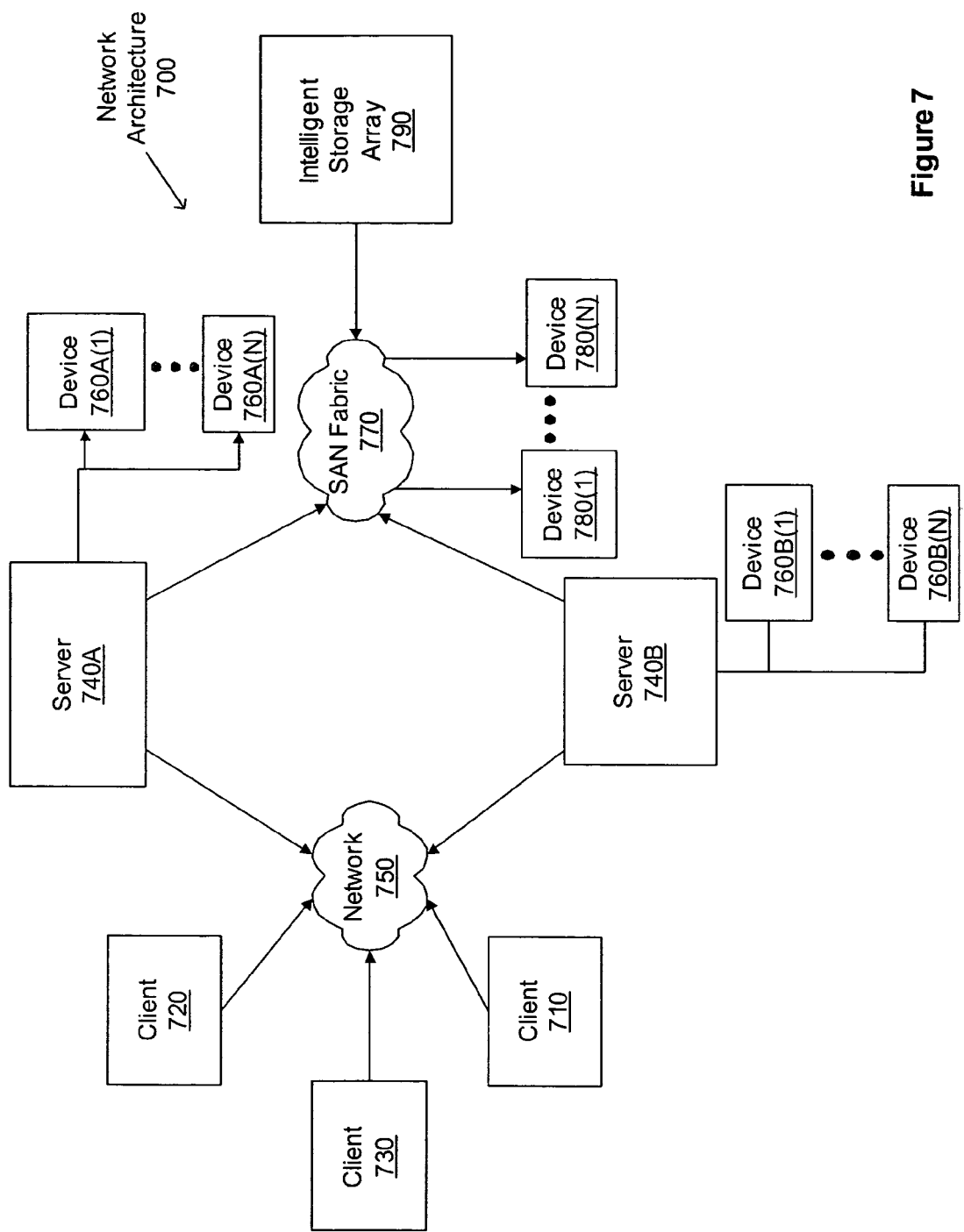
FIG. 7 is a block diagram illustrating a network environment in which locking according to embodiments of the present invention may be used.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method comprising:
requesting by a first user-level process, lock rights to a resource, wherein
said requesting is performed using a token to identify a kernel-level session associated with a lock to the resource,
the first user-level process executes on a processor, and
the resource is coupled to the processor;
if no kernel-level session exists that is associated with the token at the time of said requesting, a kernel-level session is initiated that is associated with the token and identified by the token, wherein
the kernel-level session is allocated the lock to the resource;
in response to said requesting by the first user-level process, receiving the lock rights, wherein
the lock rights are associated with the lock,
the kernel-level session persists after termination of the first user-level process and maintains association with the lock, and
the lock is associated with the kernel-level session;
requesting by a second user-level process, the lock rights to the resource, wherein
the second user-level process uses the token to perform the requesting, and
the requesting by the second user-level process occurs after the termination of the first user-level process; and
in response to said requesting by the second user-level process, receiving the lock rights, wherein
the lock rights are associated with the kernel-level session, and
the lock rights control access to the resource.

2. The method of claim 1 further comprising:
determining access rights to the resource associated with the lock.

3. The method of claim 2 further comprising:
allowing the second user-level process to complete an action initiated by the first user-level process on the resource associated with the lock.

4. A computer-implemented method comprising:
determining if an existing kernel-level session is associated with a token received from a first user-level process;
if no existing kernel-level session is associated with the token,
initiating a kernel-level session, and
associating the kernel-level session with the token, wherein
the token identifies the kernel-level session;
allocating a lock for a resource to the kernel-level session, wherein
the resource is coupled to the processor;
granting lock rights associated with the lock to the first user-level process, wherein
the kernel-level session persists after termination of the first user-level process, and
maintaining the kernel-level session allocation of the lock;
receiving a request for the lock rights to the resource, wherein
a second user-level process uses the token to perform the request; and
granting the lock rights to the second user-level process in response to the request, wherein
the lock rights are associated with the kernel-level session, and
the lock rights control access to the resource.

5. The method of claim 4 further comprising:
acquiring lock rights associated with the lock for the resource.

6. The method of claim 5 further comprising:
releasing the lock rights held by the kernel-level session; and
deallocating the lock held by the kernel-level session.

7. The method of claim 4 further comprising:
in response to the termination of the first user-level process, maintaining the lock for the resource by the kernel-level session.

8. The method of claim 7 further comprising:
providing an inventory of each locked resource held by the kernel-level session to the second user-level process; and
providing an inventory of rights for each locked resource held by the kernel-level session to the second user-level process.

9. The method of claim 4 further comprising:
associating application-defined state information with one or more kernel-level sessions and the lock for the resource.

10. A system comprising:
a processor
determining if an existing kernel-level session is associated with a token received from a first user-level process;
if no existing kernel-level session is associated with the token, initiating a kernel-level session, and
associating the kernel-level session with the token, wherein
the token identifies the kernel-level session;
a resource coupled to the processor; and
the kernel-level session is configured to
acquire a lock for the resource associated with the kernel-level session,
grant lock rights associated with the lock to the first user-level process,
persist beyond a termination of the first user-level process,
maintain the acquired lock,
receive a request for the lock rights to the resource, wherein
a second user-level process uses the token to perform the request, and
grant the lock rights to the second user-level process in response to the request, wherein
the lock rights are associated with the kernel-level session, and
the lock rights control access to the resource.

11. The system of claim 10 further comprising:
the first user-level process configured to
perform an operation in a user space on the resource, wherein
access to the resource is restricted by the lock, and
provide the token to the kernel-level session in order to acquire access to the resource.

12. The system of claim 11 further comprising:
a user-kernel interface, executed by the processor, and configured to
receive the token from the first user-level process, and
provide the token to the kernel-level session corresponding to the token.

13. The system of claim 12, wherein the user-kernel interface comprises:
a library module; and
an input/output control module.

14. An apparatus comprising:
a processor configured to execute a kernel-level session, a first user-level process, and a second user-level process;
a resource coupled to the processor;
means for initiating the kernel-level session if no existing kernel-level session is identified by the token received from the first user-level process;
means for associating the kernel-level session with the token, wherein
the token identifies the kernel-level session;
means for allocating a lock for the resource to the kernel-level session;
means for granting lock rights associated with the lock to the first user-level process, wherein
the kernel-level session persists after termination of the first user-level process, and
maintaining the kernel-level session allocation of the lock;
means for receiving a request for the lock rights to the resource, wherein the second user-level process uses the token to perform the request; and
means for granting the lock rights to the second user-level process in response to the request, wherein
the lock rights are associated with the kernel-level session, and
the lock rights control access to the resource.

15. The apparatus of claim 14 further comprising:
means for acquiring lock rights associated with the lock for the resource.

16. The apparatus of claim 14 further comprising:
means for granting the first user-level process access to the resource on provision of the token by the first user-level process to the kernel-level session.

17. The apparatus of claim 16 further comprising:
means for maintaining the lock for the resource by the kernel-level session in response to the termination of the user-level process.

18. The apparatus of claim 17 further comprising:
means for granting the second user-level process access to the resource on provision of the token by the second user-level process.

19. The apparatus of claim 18 further comprising:
means for providing an inventory of each locked resource held by the kernel-level session to the second user-level process; and
means for providing an inventory of rights for each locked resource held by the kernel-level session to the second user-level process.

20. The apparatus of claim 14 further comprising:
means for releasing lock rights for the lock by the kernel-level session; and
means for deallocating the lock by the kernel-level session.

21. The apparatus of claim 14 further comprising:
means for associating application-defined state information with one or more kernel-level sessions and the lock for the resource.

22. A computer-readable storage medium storing instructions executable by a processor, the instructions comprising:
a first set of instructions configured to initiate a kernel-level session if no existing kernel-level session is identified by a token received from a first user-level process;
a second set of instructions configured to associate the kernel-level session with the token, wherein
the token identifies the kernel-level session; and
a third set of instructions configured to allocate a lock for a resource to the kernel-level session, wherein the resource is coupled to the processor;
a fourth set of instructions configured to grant lock rights associated with the lock to the first user-level process, wherein
the kernel-level session persists after termination of the first user-level process, and
maintaining the kernel-level session allocation of the lock;
a fifth set of instructions configured to receive a request for the lock rights to the resource, wherein
the second user-level process uses the token to perform the request; and
a sixth set of instructions configured to grant the lock rights to the second user-level process in response to the request, wherein
the lock rights are associated with the kernel-level session, and
the lock rights control access to the resource.

23. The computer-readable storage medium of claim 22, the instructions further comprising:
a seventh set of instructions configured to grant the first user-level process access to the locked resource on provision of the token by the first user-level process.

24. The computer-readable storage medium of claim 23, the instructions further comprising:
an eighth set of instructions configured to maintain the lock for the resource by the kernel-level session in response to the termination of the user-level process.

25. The computer-readable storage medium of claim 24, the instructions further comprising:
a ninth set of instructions configured to grant the second user-level process access to the resource on provision of the token by the second user-level process.

26. The computer-readable storage medium of claim 25, the instructions further comprising:
a tenth set of instructions configured to provide an inventory of each locked resource held by the kernel-level session to the second user-level process, and
an eleventh set of instructions configured to provide an inventory of rights for each locked resource held by the kernel-level session to the second user-level process.

27. The computer-readable storage medium of claim 22, the instructions further comprising:
a seventh set of instructions configured to release lock rights for each lock held by the kernel-level session, and
an eighth set of instructions configured to deallocate each lock held by the kernel-level session.

28. The computer-readable storage medium of claim 22, the instructions further comprising:
a seventh set of instructions configured to associate application-defined state information with one or more kernel-level sessions and the lock for the resource.

* * * * *